(12) United States Patent
Bartlett

(10) Patent No.: US 6,746,030 B1
(45) Date of Patent: Jun. 8, 2004

(54) SHOPPING TROLLEY

(76) Inventor: Douglas James Bartlett, P.O. Box 100 672 NSMC, Auckland (NZ)

( * ) Notice: Subject to any disclaimer, the term of this patent is extended or adjusted under 35 U.S.C. 154(b) by 0 days.

(21) Appl. No.: 09/926,798

(22) PCT Filed: Jun. 21, 2000

(86) PCT No.: PCT/NZ00/00103

§ 371 (c)(1),
(2), (4) Date: Mar. 4, 2002

(87) PCT Pub. No.: WO01/00476

PCT Pub. Date: Jan. 4, 2001

(30) Foreign Application Priority Data

Jun. 24, 1999 (NZ) .................................................. 336458

(51) Int. Cl.$^7$ ................................................. B62D 7/00
(52) U.S. Cl. ............................. 280/47.38; 280/33.991; 280/33.993; 297/256.17
(58) Field of Search ....................... 280/33.991, 33.992, 280/33.993, 33.994, 47.38, 87.01, 87.02; 297/256.17; 235/380, 381, 383

(56) References Cited

U.S. PATENT DOCUMENTS

| | | | | |
|---|---|---|---|---|
| 2,443,236 A | * | 6/1948 | Gallagher ................. 280/47.35 |
| 4,629,950 A | * | 12/1986 | Ching ........................ 318/285 |
| 4,805,935 A | * | 2/1989 | Grayson ................. 280/33.992 |
| 4,861,105 A | * | 8/1989 | Merten et al. ......... 297/256.17 |
| 4,868,544 A | * | 9/1989 | Havens .................... 340/568.5 |
| 4,979,777 A | * | 12/1990 | Takada .................... 297/250.1 |
| 5,072,956 A | * | 12/1991 | Tannehill et al. ...... 280/33.992 |
| 5,265,912 A | * | 11/1993 | Natividad ................... 280/828 |
| 5,277,473 A | * | 1/1994 | Kelly et al. ............... 297/250.1 |
| 5,330,210 A | * | 7/1994 | Lambrecht ............. 280/33.993 |
| 5,361,871 A | * | 11/1994 | Gupta et al. .................. 186/61 |
| 5,418,354 A | * | 5/1995 | Halling et al. ............... 235/383 |
| 5,425,438 A | * | 6/1995 | Sonnendorfer et al. ..... 194/212 |
| 5,482,352 A | * | 1/1996 | Leal et al. ................ 297/217.4 |
| 5,557,086 A | * | 9/1996 | Schulze et al. ............. 235/380 |
| 5,611,597 A | * | 3/1997 | Lanz ...................... 297/256.17 |
| 5,624,156 A | * | 4/1997 | Leal et al. ................ 297/217.4 |
| 5,641,200 A | * | 6/1997 | Howell ................... 297/256.17 |
| 5,704,527 A | * | 1/1998 | Struzer ......................... 224/547 |
| 5,773,954 A | * | 6/1998 | VanHorn ..................... 320/137 |
| 5,836,051 A | * | 11/1998 | Myers .......................... 16/436 |
| 5,838,808 A | * | 11/1998 | Prosser ......................... 381/388 |
| 5,848,797 A | * | 12/1998 | Paez ....................... 280/33.993 |
| 5,937,961 A | * | 8/1999 | Davidson .................... 180/166 |
| 5,938,216 A | * | 8/1999 | Weng ...................... 280/47.38 |
| 6,024,281 A | * | 2/2000 | Shepley ....................... 235/375 |
| 6,054,923 A | * | 4/2000 | Prather et al. ........... 340/568.5 |
| 6,092,705 A | * | 7/2000 | Meritt ......................... 224/275 |
| 6,102,476 A | * | 8/2000 | May et al. ................ 297/217.3 |
| 6,142,369 A | * | 11/2000 | Jonstromer ................. 235/380 |
| 6,216,927 B1 | * | 4/2001 | Meritt ......................... 224/275 |
| 6,270,093 B1 | * | 8/2001 | Johnson et al. ........ 280/33.993 |
| 6,271,755 B1 | * | 8/2001 | Prather et al. ........... 340/568.5 |
| 6,405,817 B1 | * | 6/2002 | Huntsberger et al. ...... 180/65.1 |
| 6,435,407 B1 | * | 8/2002 | Fiordelisi ..................... 235/383 |
| 6,464,238 B2 | * | 10/2002 | Reiland et al. ........ 280/33.993 |
| 6,474,659 B1 | * | 11/2002 | Horchler et al. ........... 280/1.14 |
| 6,484,939 B1 | * | 11/2002 | Blaeuer ....................... 235/383 |

FOREIGN PATENT DOCUMENTS

| | | | |
|---|---|---|---|
| IT | WO 9842239 | * | 3/1998 |
| WO | WO98/42239 | | 10/1998 |

* cited by examiner

*Primary Examiner*—Brian L. Johnson
*Assistant Examiner*—Kelly E Campbell
(74) *Attorney, Agent, or Firm*—Jacobson Holman PLLC

(57) ABSTRACT

A shopping trolley has a passenger compartment, and an entertainment system such as sound or sound and video providing device. In use a child may be placed inside the passenger compartment and entertained while an adult shops using the trolley to carry goods as well as the child.

16 Claims, 2 Drawing Sheets

SHOPPING TROLLEY

This is a nationalization of PCT/NZ00/00103 filed Jun. 21, 2000 and published in English.

TECHNICAL FIELD

This invention relates to shopping trolleys and specifically to shopping trolleys featuring passenger compartments for children.

BACKGROUND ART

Shopping trolleys having compartments for children are known. Some of these trolleys may have compartments resembling automobile bodies.

It is the object of the present invention to provide a shopping trolley having features to occupy a child while also transporting the child or to at least provide the public with a useful choice.

DISCLOSURE OF THE INVENTION

The present invention consists in a shopping trolley having a passenger compartment characterised in that there is included a sound providing means.

BRIEF DESCRIPTION OF THE DRAWINGS

Examples of the present invention will now be described with reference to the accompanying drawing, in which.

DESCRIPTION OF BEST MODES

Figure 1:
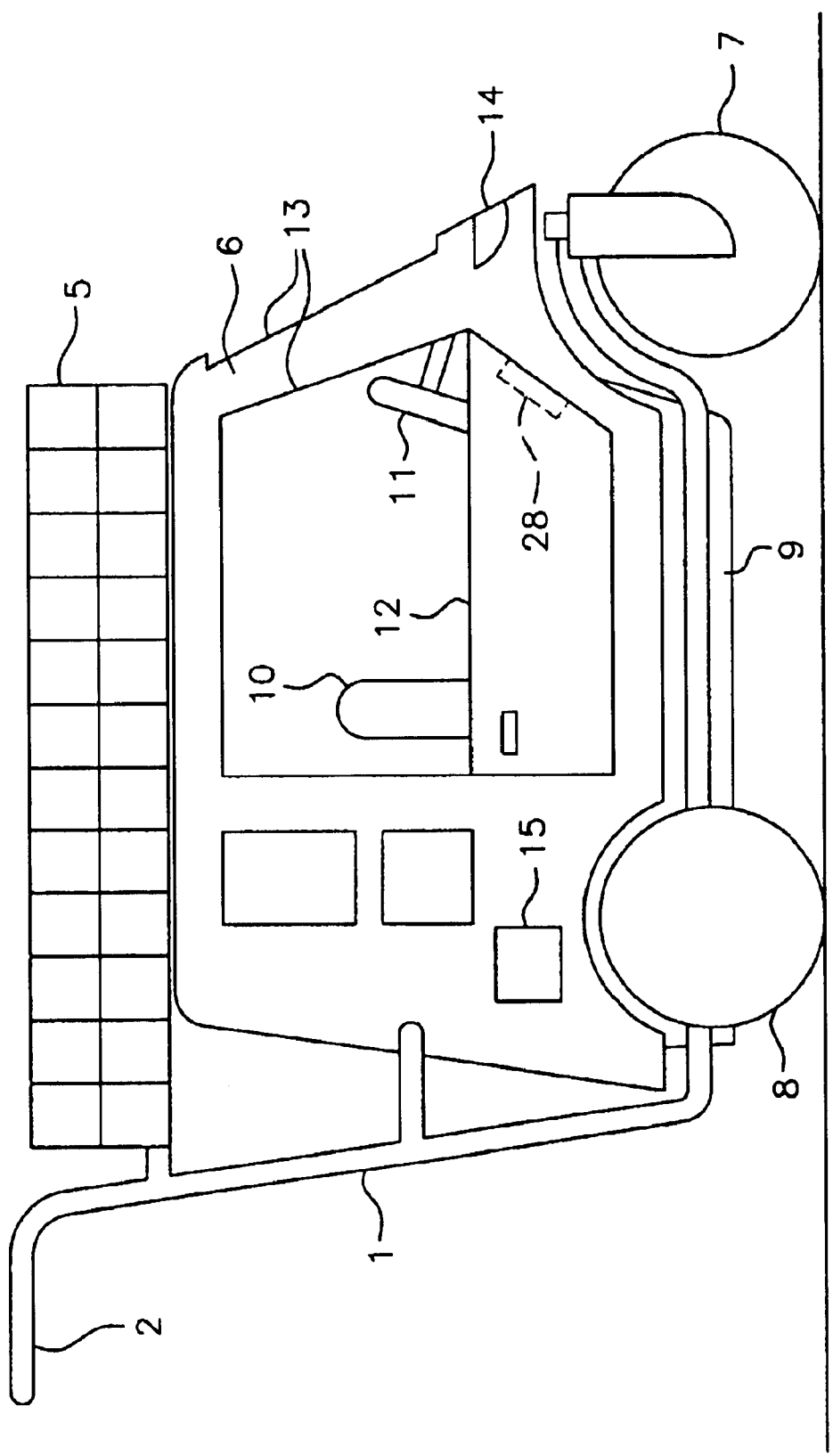
FIG. 1 is a schematic side elevation view of a preferred form of the invention.
Figure 2:
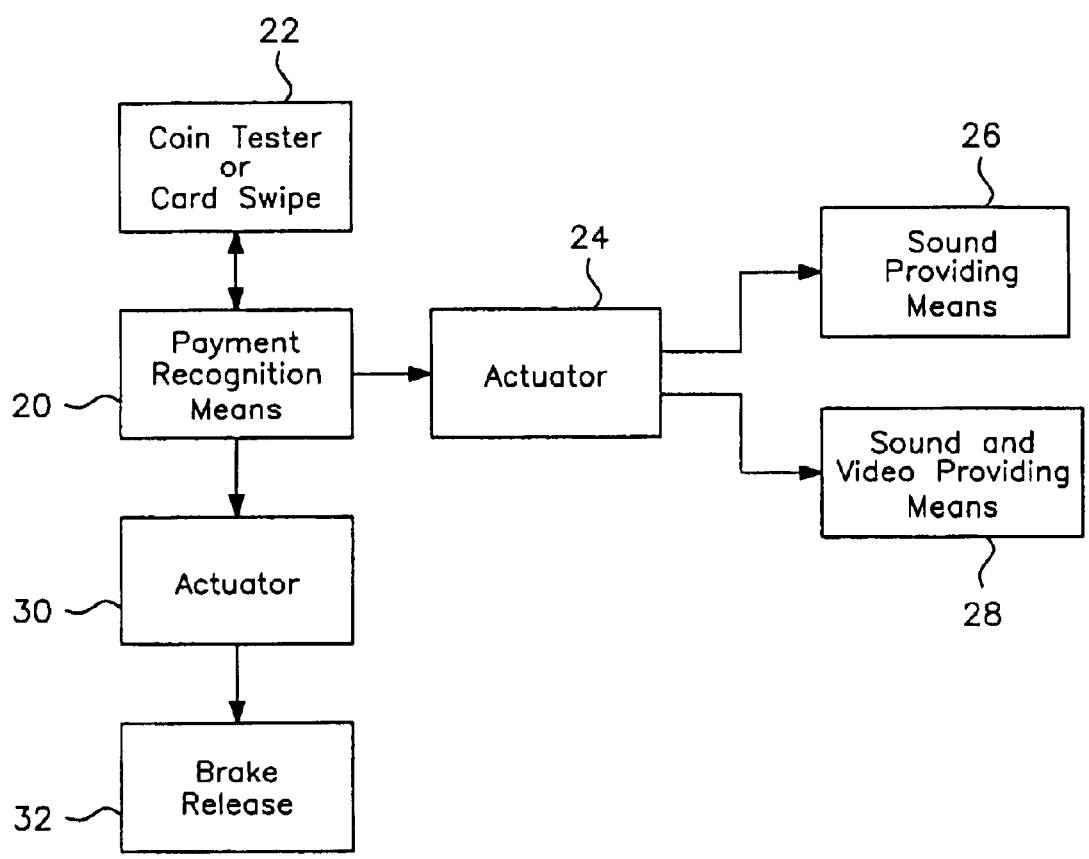
FIG. 2 is a flow chart of the payment recognition device.

The subject matter of this disclosure pertains to a shopping trolley, an example of which is shown schematically in FIG. 1. The shopping trolley includes a goods carrying means, a set of wheels, a handling means, a passenger compartment, and a sound providing means which is not shown in FIG. 1.

In the form as shown the shopping trolley features a durable frame (1) to which are fixed two pairs of wheels (7,8) with one pair of wheels (7) being pivotally attached to the frame to facilitate the steering of the trolley. In use, the trolley is propelled and directed by a user of the trolley who would generally manipulate the trolley by way of the handle (2). In the preferred form of the invention as shown in FIG. 1, the handle is an intrinsic part of the trolley's frame. Also attached to the frame is a passenger compartment (6) resembling the body of an automobile and a goods carrying means such as a wire basket (5) for carrying goods. The wheels and the passenger compartment are relatively positioned to maintain the resemblance to an automobile.

The passenger compartment includes a seat (10) and a non-functional steering wheel (11) and other features that may resemble features of an automobile such as doors (12), windows (13), headlights (14) and a petrol cap (15). It may also include a seat belt (not shown). The user of the trolley may place a child inside the passenger compartment. When the trolley is in use the child may be entertained by sitting in the seat and "driving the car" while at the same time being retained and protected by the passenger compartment. Preferably, the child will be sitting so as to face the normal direction of travel of the trolley to add to the enjoyment of the ride for the child. The construction of the passenger compartment and the seat belt will preferably keep the child safe and restrained while an accompanying adult shops.

In other forms of the invention the passenger compartment may take other forms but it will preferably model a vehicle, animal or fantasy construct.

In the preferred form of the invention as shown in FIG. 1 the passenger compartment (6) also features a sunken floor pan (9). The floor plan protects the test and legs of children by preventing their feet from exiting the underside of the passenger compartment.

The shopping trolley also includes a sound providing means 26. Generally this will consist of a loudspeaker or speakers and a media player such as a compact disc or cassette player capable of playing music, stories and other sounds to a passenger in the passenger compartment. In other forms of the invention the sound providing means 26 may consist of a speaker or speakers and a receiver such as a radio receiver capable of receiving external signals and playing them through the speaker(s). In the preferred form of the invention the sound providing means 26 is integrated into the passenger compartment 6 said compartment 6 being manufactured primarily of thermoplastics and being moulded to provide berths for the components of the sound providing means 26.

In another form the sound providing means may be complemented by a video providing means. In such a case, the sound and video providing means 28 may include a speaker, screen and a media player or receiver or games console. The sound and video providing means 28 may be supplemented by a controller to allow a person in the passenger compartment to interact with the sound and video providing means 28 allowing them to control the operation of the sound and video providing means 28 and/or to play video games.

Preferably the passenger compartment 6 will be made predominantly of moulded thermoplastics and the sound and video providing means will be integrated with the passenger compartment by way of being fixed to or in the plastic compartment preferably in a specially provided berth or berths.

The shopping trolley my also include a payment recognition means 20 which may include a coin tester or card swipe 22, and an actuator 24. When the payment recognition means 20 recognises that the correct payment has been inserted or credited it may signal the actuator 24 to activate the sound providing means 26 or the sound and video providing means 28. A second actuator 30 also receiving signals from the payment recognition means 20 may also be a feature and this may release a brake 32 allowing the trolley to be moved freely. The actuator(s) 24, 30 and payment recognition means 20 may take a variety of electrical, electronic and mechanical forms. The specific form of these components is not the subject of the present invention.

INDUSTRIAL APPLICABILITY

The present invention provides a shopping trolley able to carry both goods and a small passenger and able to provide such small passenger with entertainment.

What is claimed is:

1. A shopping trolley comprising a passenger compartment, a goods carrying basket located on top of the passenger compartment, a set of wheels mounted exteriorly of the passenger compartment, a handle located exteriorly of the passenger compartment for directing the wheels, a sound providing system providing audio entertainment to the passenger compartment, the sound providing system being integrated into the passenger compartment, and a payment recognition device controlling an actuator for activating the sound providing system when payment has been recognized.

2. A shopping trolley as claimed in claim 1 wherein the sound providing system consists of a speaker and a media player capable of playing sounds to a passenger in the passenger compartment.

3. A shopping trolley as claimed in claim 2 wherein the media player is a compact disc player.

4. A shopping trolley as claimed in claim 2 wherein the media player is a audio cassette player.

5. A shopping trolley as claimed in claim 1 wherein the sound providing system consists of a speaker and a receiver adapted to receive external signals and play them through the speaker.

6. A shopping trolley as claimed in claim 5 wherein the receiver is a radio receiver.

7. A shopping trolley as claimed in claim 1 further comprising a video providing device for providing video entertainment to the passenger compartment.

8. A shopping trolley as claimed in claim 7 wherein the sound providing system and video providing device consists of a speaker, a screen and a receiver adapted to receive signals from an external source a to play said signals through the speaker and screen.

9. A shopping trolley as claimed in claim 7 wherein the sound providing system and video providing device are integrated into the passenger compartment.

10. A shopping trolley as claimed in claim 7 wherein the sound providing system and video providing device consist of a speaker, a screen and a media player capable of playing sounds and images to a passenger in the passenger compartment.

11. A shopping trolley as claimed in claim 10 wherein the media player is a digital video disc player.

12. A shopping trolley as claimed in claim 10 wherein the media player is a video cassette player.

13. A shopping trolley as claimed in claim 10 wherein the media player is a computer.

14. A shopping trolley as claimed in claim 10 wherein the media player is a game console.

15. A shopping trolley as claimed in claim 1 further comprising a brake and a second actuator adapted to release said brake.

16. A shopping trolley as claimed in claim 1 wherein said payment recognition device includes a coin tester.

\* \* \* \* \*